Figure 1:
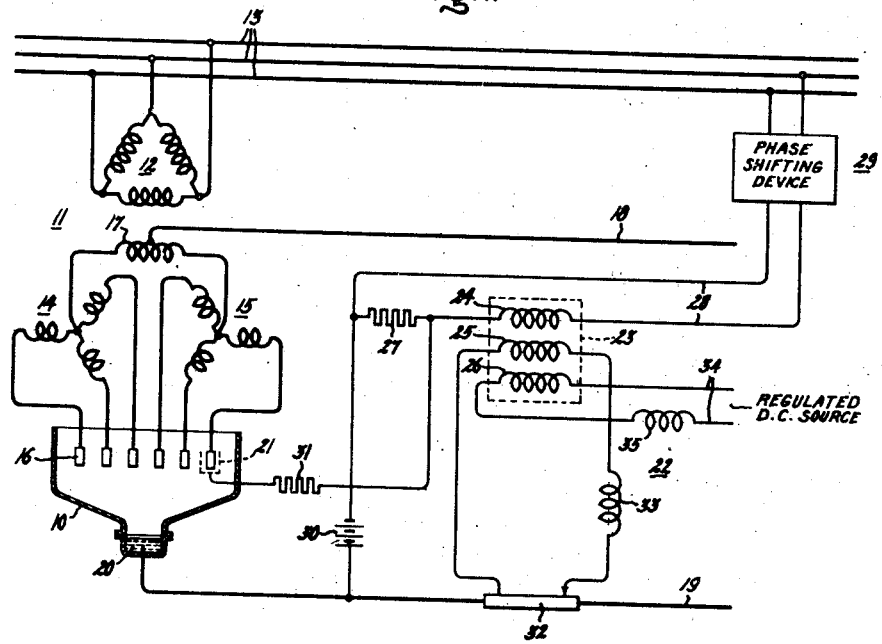

Sept. 16, 1947.   J. A. AUGIER   2,427,542
ELECTRIC CONTROL CIRCUIT
Filed July 26, 1943   2 Sheets-Sheet 1

Inventor:
Jean A. Augier,
by *Harry E. Dunham*
His Attorney.

Patented Sept. 16, 1947

2,427,542

UNITED STATES PATENT OFFICE 2,427,542

ELECTRIC CONTROL CIRCUIT

Jean A. Augier, Belfort, France, assignor to General Electric Company, a corporation of New York Application July 26, 1943, Serial No. 496,223
In France February 20, 1942

3 Claims. (Cl. 171—242)

My invention relates to electric control circuits and more particularly to improved electric control circuits for producing a voltage of steep wave front having a variable phase position with respect to a sinusoidal alternating-current voltage wave. My invention is particularly applicable to the control of electric discharge devices having either electrostatic or make-alive type starting electrodes.

Many static circuits for producing voltages of steep wave front for the control of electric discharge valves have been utilized and many of these employ control windings energized by a unidirectional voltage of variable magnitude for controlling the phase relation of the steep wave front voltage. In these systems, it has been common practice to employ smoothing reactors in series with the control windings for the purpose of minimizing the ripple in the direct-current ampere turns. I have found that control circuits constructed in accordance with the teachings of the prior art have had a decided tendency toward instability and hunting when they are sensitive to changes in the condition to be controlled. In accordance with the teachings of my invention, the stability of circuits of this type has been greatly improved while retaining a high degree of sensitivity by designing the circuit or circuits of the control windings so that they have a high time constant, considerably higher than required or normally used for reducing the ripple. Provision is also made for imparting to the control winding circuits more than one time constant so that the variation of the controlling ampere turns may occur in the most favorable manner for regulating purposes under different operating conditions.

It is an object of my invention to provide new and improved electric control circuits.

It is another object of my invention to provide new and improved electric control circuits for producing a steep wave front voltage of variable phase relation with respect to an alternating-current voltage wave.

It is still another object of my invention to provide a new and improved control circuit particularly adapted for controlling the operation of electric valve means, which is capable of sensitive regulating action and is characterized by stability of operation and a freedom from hunting action.

In accordance with an illustrated embodiment of my invention, the control member of the electrostatic type of an electric valve rectifier is energized by the voltage appearing across a resistance element. The resistance element is connected in series with a source of alternating voltage and the impedance winding of a saturable inductive device having a control winding energized from a regulated source of direct current and a second control winding energized in accordance with the current supplied to the direct-current load circuit by the electric valve rectifier. The time constants of the circuits of both of the control windings are made high by means of inductive reactances individual to each of the circuits. In accordance with other illustrated embodiments, the electric valve means is regulated in accordance with some other condition to be controlled and the time constants of the control winding circuit are obtained by several different means, some of which offer a more economical system as compared with the separate series-connected inductances.

My invention will be better understood by reference to the following description taken in connection with the accompanying drawing and its scope will be pointed out in the appended claims. In the drawing, Fig. 1 is a schematic representation of one embodiment of my invention, and Figs. 2 to 7, inclusive, illustrate schematically modifications of the circuit of Fig. 1 which are suited for regulating in accordance with different electrical conditions or for obtaining high time constants in the circuit of the control windings in different ways.

Referring now to Fig. 1 of the drawing, I have shown my invention applied to the control of an electric valve rectifier comprising an electric discharge device 10 and a transformer 11 having a mesh-connected primary winding 12 energized from a polyphase alternating-current circuit 13 and a pair of star-connected secondary windings 14 and 15 having the phase terminals thereof connected with the anodes 16 of the electric discharge device 10. The neutral terminals of the windings 14 and 15 are interconnected by an interphase transformer 17 having an intermediate terminal connected to one of the lines 18 of the direct-current circuit. The other line 19 of the direct-current circuit is connected with the cathode 20 of the discharge device 10 which, as illustrated, comprises a mercury pool. The control member or grid 21 of the electric discharge device is energized from an excitation or control circuit 22 and which comprises a saturable inductive device 23 having an alternating current or an impedance winding 24 and a pair of control windings 25 and 26. The saturable inductive device 23, itself, may be of one of the types well known in the art having a core structure arranged to saturate during the alternating-current voltage cycle. The alternating-current winding 24 is connected in series with an impedance element, such as resistor 27, and an alternating-current supply circuit 28 of suitable phase relation which, as illustrated is obtained from the output of a phase-shifting circuit 29 energized from the alternating-current circuit 13.

The circuit of the control member 21 is completed from the cathode 20 through a source of unidirectional biasing voltage, such as a battery 30, the resistor 27, and a current-limiting resistor 31. As is well understood, when the core structure of device 23 saturates, the impedance of the winding 24 decreases and the voltage across the resistor 27 increases rapidly to produce a steep wave front voltage. The time in the alternating-current voltage wave of circuit 13 that this steep wave front voltage appears across resistor 27 is controlled by the net magnetomotive force impressed on the core structure of device 23 by the control windings 25 and 26. In the drawing only one control member 21 and one circuit 22 has been illustrated. It will be understood that a control member is associated with each anode 16 and that a control circuit 22 is provided for each control member. The respective control windings of the devices 23 for the different control members may to advantage be connected in series. The control winding 25 is energized in accordance with the current supplied to the direct-current output circuit by the voltage appearing across a shunt 32 connected in the direct-current line 19. An inductive impedance element 33 is connected in series with the winding 25 and, in accordance with the present invention, has sufficient impedance to give the time constant of the circuit including winding 25 a high value. For example, in accordance with the teachings of the prior art where the inductance of the control winding circuit has been adjusted to minimize the D.-C. ripple, the time constant might have a value of the order of one-tenth of a second whereas, in accordance with the teachings of the present invention, the time constant is made much higher, for example, of the order of one to several seconds. The control winding 26 is energized from a source of direct-current voltage 34 which is preferably regulated to a constant value and of such polarity that the magnetomotive forces produced by windings 25 and 26 are opposed. The circuit of control winding 26 includes an inductive reactance 35 which also gives the circuit of winding 26 a high time constant.

Figure 2:
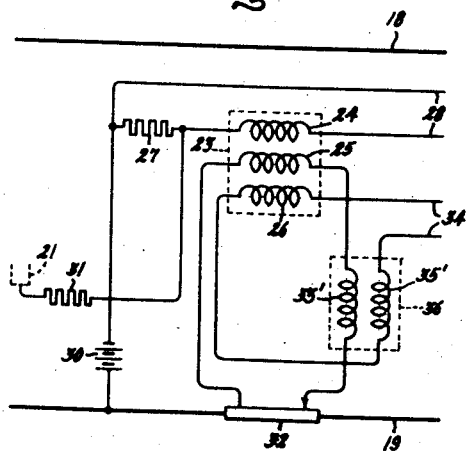

The physical size of the inductances 33 and 35 of the embodiment of my invention illustrated in Fig. 1 required for imparting the desired time constants to the circuits of the control windings is sufficient to render them bulky and expensive. In accordance with the modification illustrated in Fig. 2, a more economical arrangement of inductances in the circuits of control windings 25 and 26 is provided. In Fig. 2, the valve-converting apparatus has been omitted to simplify the drawing and corresponding parts have been given the same reference numerals. Referring now to Fig. 2, the inductive winding 33' in series with control winding 25 and the inductive winding 35' in series with control winding 26 are arranged on the core of a single inductive device 36 and arranged so that their ampere turns are in opposition and with their turns ratio the same as the turns ratio of the windings 25 and 26. The windings 33' and 35' are closely coupled so that the variation of the unidirectional ampere turns produced by windings 25 and 26 is governed by a single time constant which is the sum of the time constants of the two circuits. It is apparent that this arrangement will reduce the overall size and cost of the impedance elements required.

Figure 3:
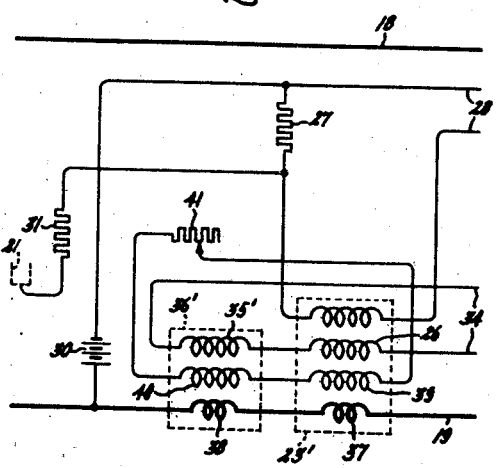

In the modification illustrated in Fig. 3, the shunt 32 and the control winding 25 have been replaced by a current control winding 37 made up of one or more turns of the direct-current line 19 and the winding 33' has been replaced on the device 36' by one or more turns 38 of the conductor 19. The devices 23' and 36' are provided with windings 26 and 35' corresponding to the windings 26 and 35' of devices 23 and 26 of Fig. 2. Inasmuch as it may be difficult to impart to the circuits of the windings 26 and 35', and 37 and 38 time constants of sufficiently high magnitude, by the use of directly connected series reactances this effect may be accomplished by providing the inductive devices 23' and 36' with windings 39 and 40, respectively, which are closely coupled with the control windings of these devices and electrically connected in series in a closed circuit including an adjustable resistance 41 which may be adjusted to adjust the time constants. In some cases, it may be desirable to omit the resistance 41 entirely and short circuit the series-connected windings 39 and 40 on themselves.

Figure 4:
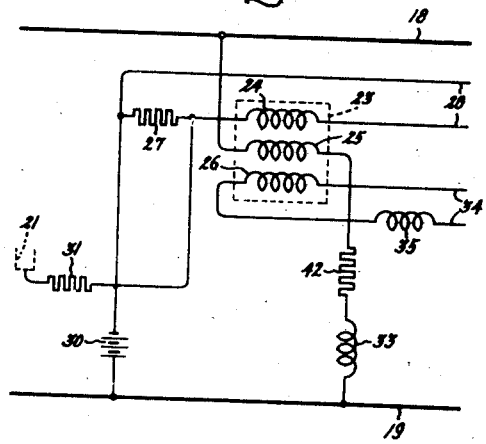
Figure 5:
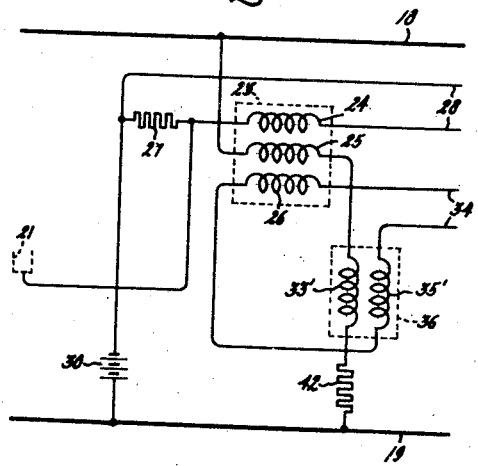
Figure 6:
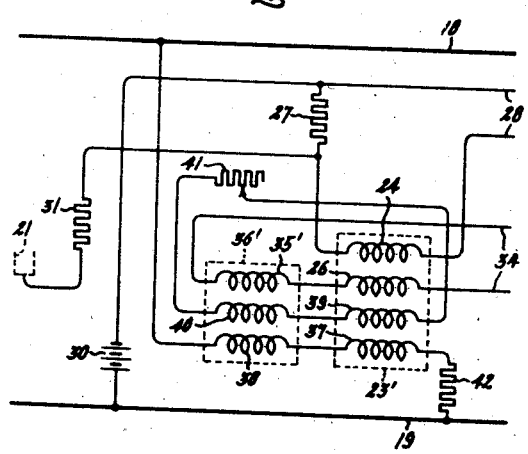

Figs. 4, 5 and 6 correspond to Figs. 1, 2, and 3, respectively, and illustrate the invention applied to voltage regulation rather than current regulation. In each of these figures, the variably energized control winding is connected across the direct-current line 18—19 through a current-limiting resistance 42 and an inductive winding corresponding to the inductive winding of the corresponding Figs. 1 to 3. It is believed that the arrangement of these circuits is apparent from the foregoing description of Figs. 1 to 3, inclusive.

Figure 7:
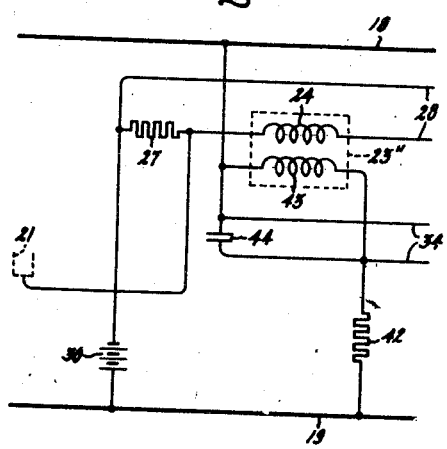

In Fig. 7 I have shown a modification of my invention in which only one control winding is employed and connected to be energized in accordance with the difference between the direct-current voltage of the electric valve rectifier and a reference voltage provided by the direct-current supply line 34. The device 23" includes the impedance winding 24 and a single control winding 43. The time constant of the circuit of winding 43 is controlled by a capacitance 44 connected in parallel with the winding 43 and in accordance with the invention is made sufficiently high to produce stable regulating action.

While the operation of the circuits described above in accomplishing automatic regulation in connection with electric valve converting apparatus is in general well understood a brief description of the operation of the system as a whole follows: When the circuit 13 is energized, the converting apparatus including electric valve means 10 and the transformer 11 operates to transfer energy to the direct-current circuit 18—19. Each of the anodes 16 of the valve means 10 starts to conduct at an instant in the anode-cathode voltage wave determined by the phase position of the steep wave front voltage produced across the resistor 27. The position of the adjustable tap on the shunt 32 controls the magnitude of the current for which the regulator is adjusted to maintain. When the current tends to exceed that value, the unidirectional magnetomotive force produced by winding 25 increases and, since this magnetomotive force is smaller and in opposed relation to the magnetomotive force of the winding 26, it decreases the net flux in the core of device 23 due to the control windings 25 and 26 and thereby retards the instant at which the core of device 23 saturates. The rate of change of the D.-C. ampere turns produced by control windings 25 and 26 is controlled by the time constants of the circuits of control windings 25 and 26 so that instability and the tendency to hunt of the regulator due to the inherent time lag in the regulator is almost entirely avoided while, at the same time, retaining desirable sensitivity and high speed of regulating action.

While I have shown and described particular embodiments of my invention, it will be obvious to those skilled in the art that changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States, is:

1. A control circuit for producing a periodic voltage of steep wave front comprising a source of alternating voltage, a saturable inductive impedance device including an alternating-current winding and a pair of control windings, means for energizing one of said control windings from a source of regulated direct-current voltage, means for regulating the other of said windings with a direct-current voltage which varies in accordance with an electrical condition to be controlled, inductive impedance means connected in circuit with each of said control windings and comprising closely coupled windings on a common magnetic core, said windings having a turns ratio equal to the turns ratio of the control windings, the magnitude of the reactance interposed in circuit with said control windings by said inductive impedance means being of sufficient magnitude to impart to the circuit of said control winding a time constant considerably higher than that imparted by an ordinary smoothing reactor and thereby to stabilize the regulating action of said control circuit.

2. A control circuit for producing a periodic voltage of steep wave front comprising a source of alternating voltage, a saturable inductive impedance device including an alternating-current winding and a pair of control windings, means for energizing one of said control windings from a source of regulated direct-current voltage, means for regulating the other of said windings with a direct-current voltage which varies in accordance with an electrical condition to be controlled, inductive impedance means connected in circuit with each of said control windings and comprising closely coupled windings on a common magnetic core, the magnitude of the reactance interposed in circuit with said control winding by said reactance means being of sufficient magnitude to impart to the circuit of said control winding a time constant considerably higher than that imparted by an ordinary smoothing reactor and thereby to stabilize the regulating action of said control circuit.

3. A control circuit for producing a periodic voltage of steep wave front comprising a source of alternating-current voltage, an output circuit, a saturable inductive device including a core structure, an alternating-current winding, a pair of control windings, a second inductive device including a pair of control windings, means connecting one control winding of each of said devices in series and to a supply of unidirectional voltage which varies in accordance with an electrical condition to be controlled, means connecting the other control winding of each of said devices in series and to a supply of reference unidirectional voltage so that said saturable inductive device becomes saturated at variable times in the voltage wave of said alternating-current source depending upon the magnitude of said variable unidirectional voltage, an additional winding on each of said devices and connected in a closed circuit for increasing the time constant of the circuits of said control windings to improve the stability of said control circuit, and means connecting said output circuit for energization with a periodic voltage which varies in phase in accordance with variations in the instants of saturation of said saturable inductive device.

JEAN A. AUGIER.

REFERENCES CITED

The following references are of record in the file of this patent:

UNITED STATES PATENTS

| Number | Name | Date |
|---|---|---|
| 2,103,996 | Bedford | Dec. 28, 1937 |
| 2,103,997 | Bedford | Dec. 28, 1937 |
| 2,112,051 | Schmidt | Mar. 22, 1938 |
| 2,337,253 | Lamm | Dec. 21, 1943 |
| 2,142,837 | Edwards | Jan. 3, 1939 |
| 1,968,346 | Neiss | July 31, 1934 |